US012703445B2

(12) United States Patent
Beard, III et al.

(10) Patent No.: US 12,703,445 B2
(45) Date of Patent: Aug. 11, 2026

(54) TETHERED MOBILE CLIMBING ROBOT FOR INSPECTING TANKS IN CONFINED ENVIRONMENTS

(71) Applicants: James Walter Beard, III, Cookeville, TN (US); David Andrew Bryant, Lebanon, TN (US); Stephen Lee Canfield, Cookeville, TN (US)

(72) Inventors: James Walter Beard, III, Cookeville, TN (US); David Andrew Bryant, Lebanon, TN (US); Stephen Lee Canfield, Cookeville, TN (US)

( * ) Notice: Subject to any disclaimer, the term of this patent is extended or adjusted under 35 U.S.C. 154(b) by 762 days.

(21) Appl. No.: 17/191,629

(22) Filed: Mar. 3, 2021

(65) Prior Publication Data

US 2021/0276641 A1 Sep. 9, 2021

Related U.S. Application Data

(60) Provisional application No. 62/985,046, filed on Mar. 4, 2020.

(51) Int. Cl.
*B62D 57/024* (2006.01)
*B25J 5/00* (2006.01)
*B25J 19/02* (2006.01)

(52) U.S. Cl.
CPC ............ *B62D 57/024* (2013.01); *B25J 5/007* (2013.01); *B25J 19/023* (2013.01)

(58) Field of Classification Search
CPC ....... B60B 19/006; B25J 5/007; B25J 19/023; B62D 55/265; B62D 57/024
USPC .................................................. 180/164, 167
See application file for complete search history.

(56) References Cited

U.S. PATENT DOCUMENTS

2017/0252931 A1* 9/2017 Zhang ...................... B25J 17/02

FOREIGN PATENT DOCUMENTS

CN 106043486 A * 10/2016 ........... B62D 57/024
EP 526900 A1 * 2/1993 ............. B62D 49/04

* cited by examiner

*Primary Examiner* — Valentin Neacsu
*Assistant Examiner* — Felicia L. Brittman-Alabi

(57) ABSTRACT

A Mobile Climbing Robot (MCR) with wheel or endless-track type propulsion using magnetic attraction for generating adhering forces is adapted to climbing non-planar surfaces such as intersecting walls, pipes or other structural members. A tether is connected to the MCR through a tether linkage that causes the tether to bend with a radius that keeps it from protruding outside of the MCR wheels. The purpose of this is to increase the mobility when passing over variations of the climbing surface such as edges or corners. The purpose is to further protect the tether from wear caused by rubbing with the climbing surface.

4 Claims, 6 Drawing Sheets climbing robot with tether linkage navigating over a convex climbing surface

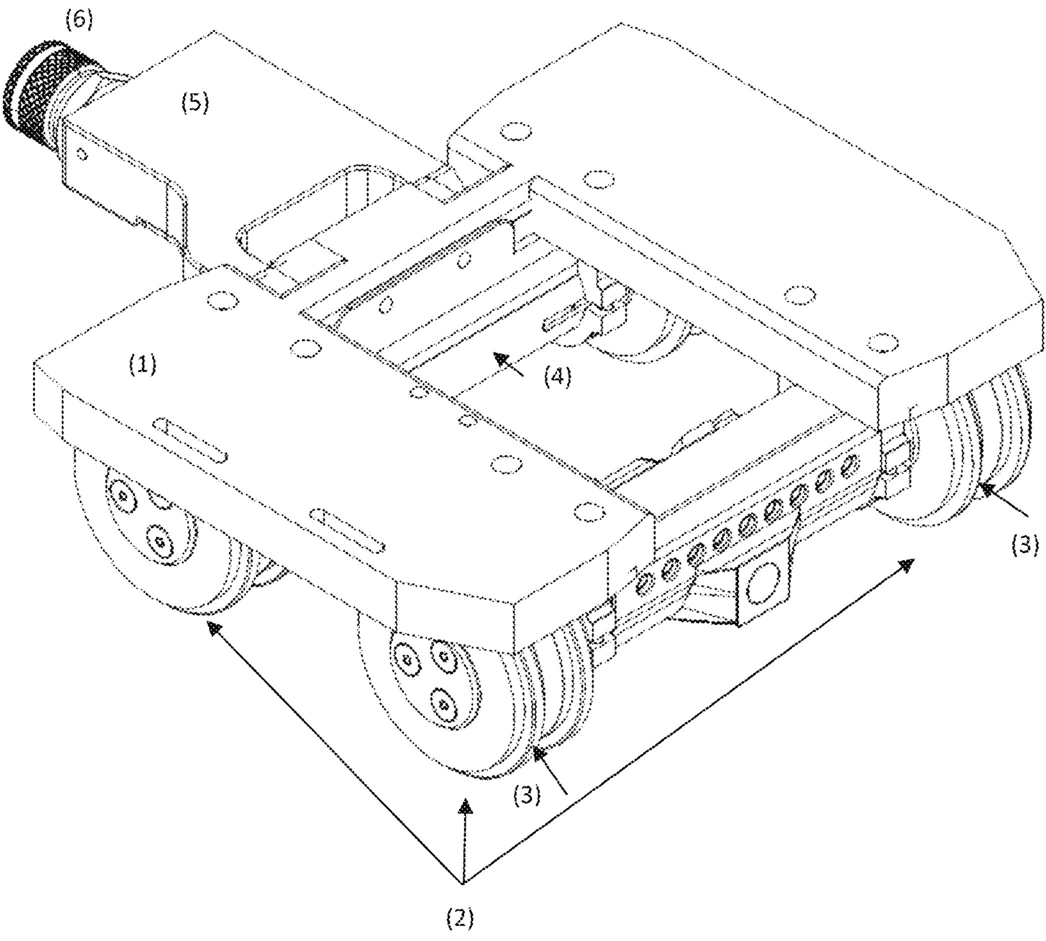
Figure 1: Isometric view of climbing robot with tether linkage

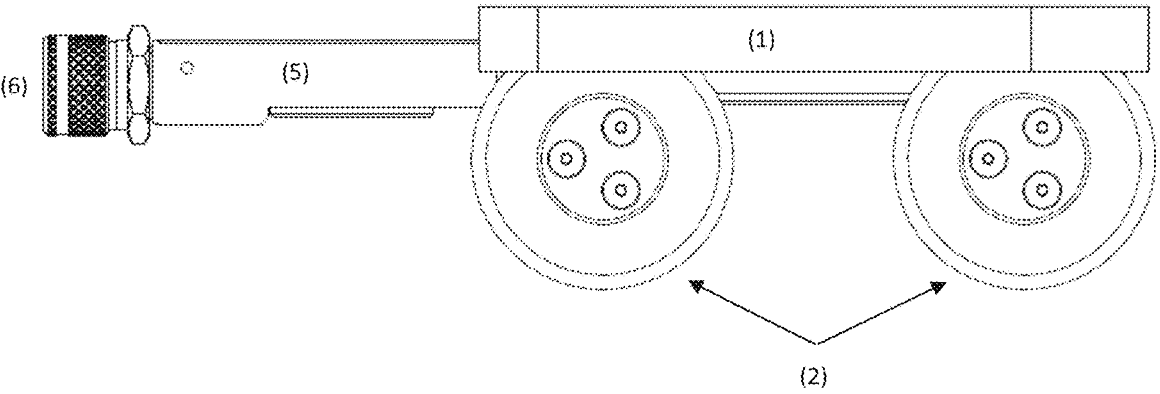
Figure 2: Side view of climbing robot with tether linkage

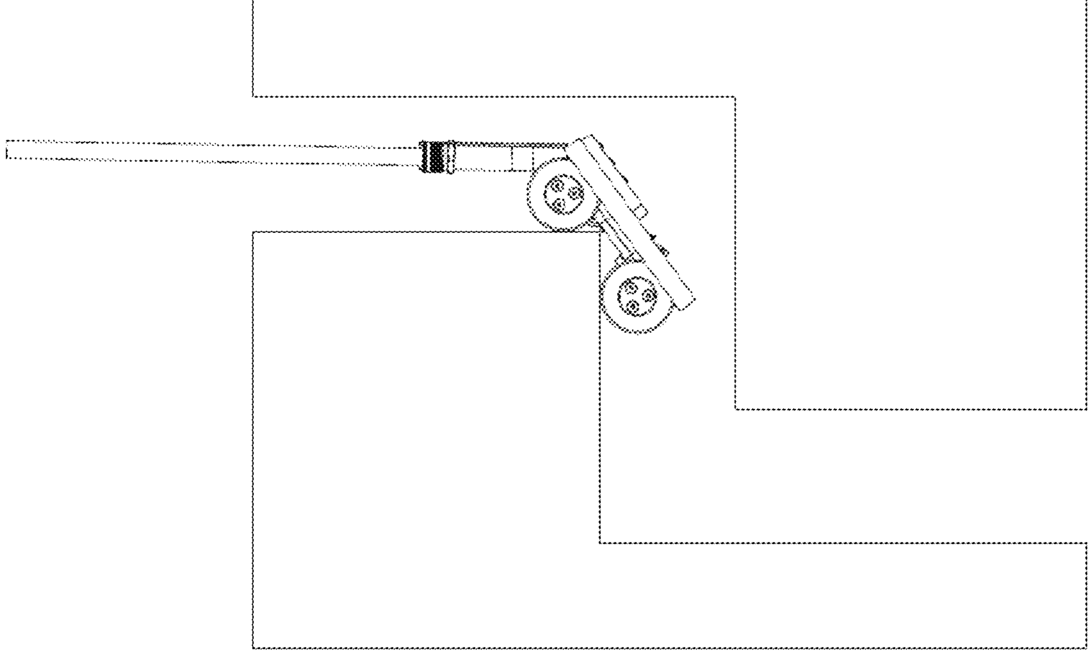
Figure 3: climbing robot with tether linkage navigating over a convex climbing surface

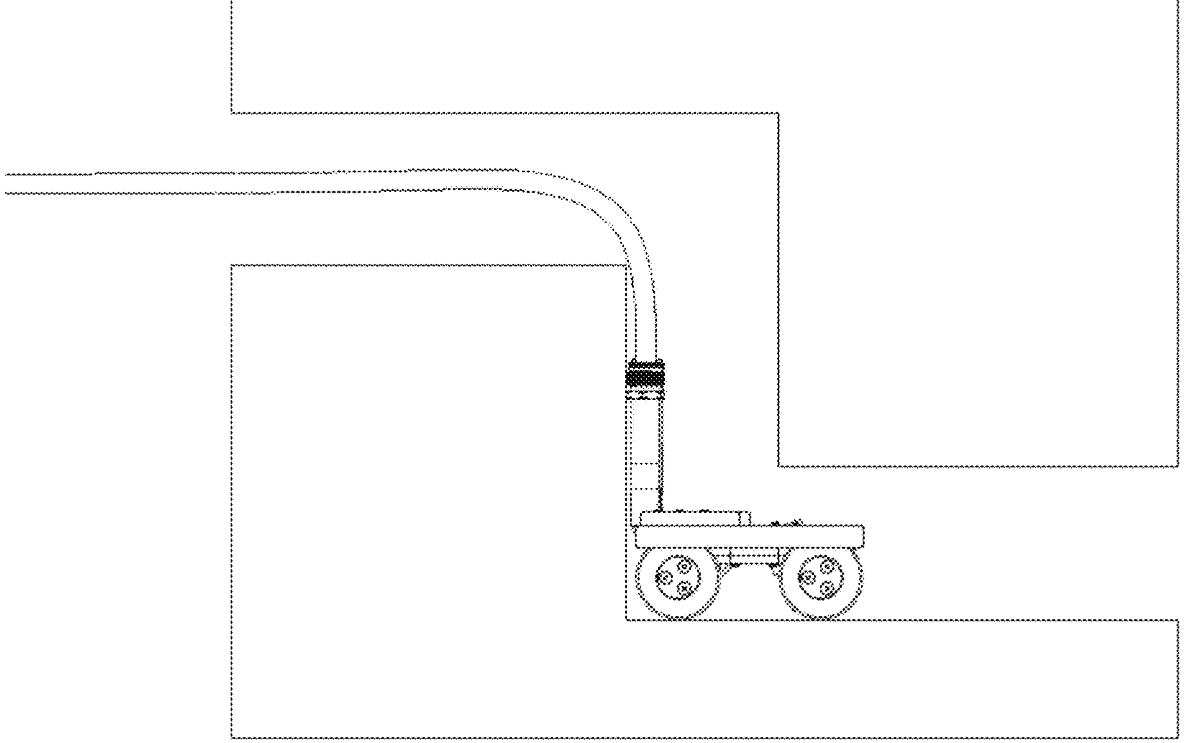
Figure 4: climbing robot with tether linkage navigating over a concave climbing surface

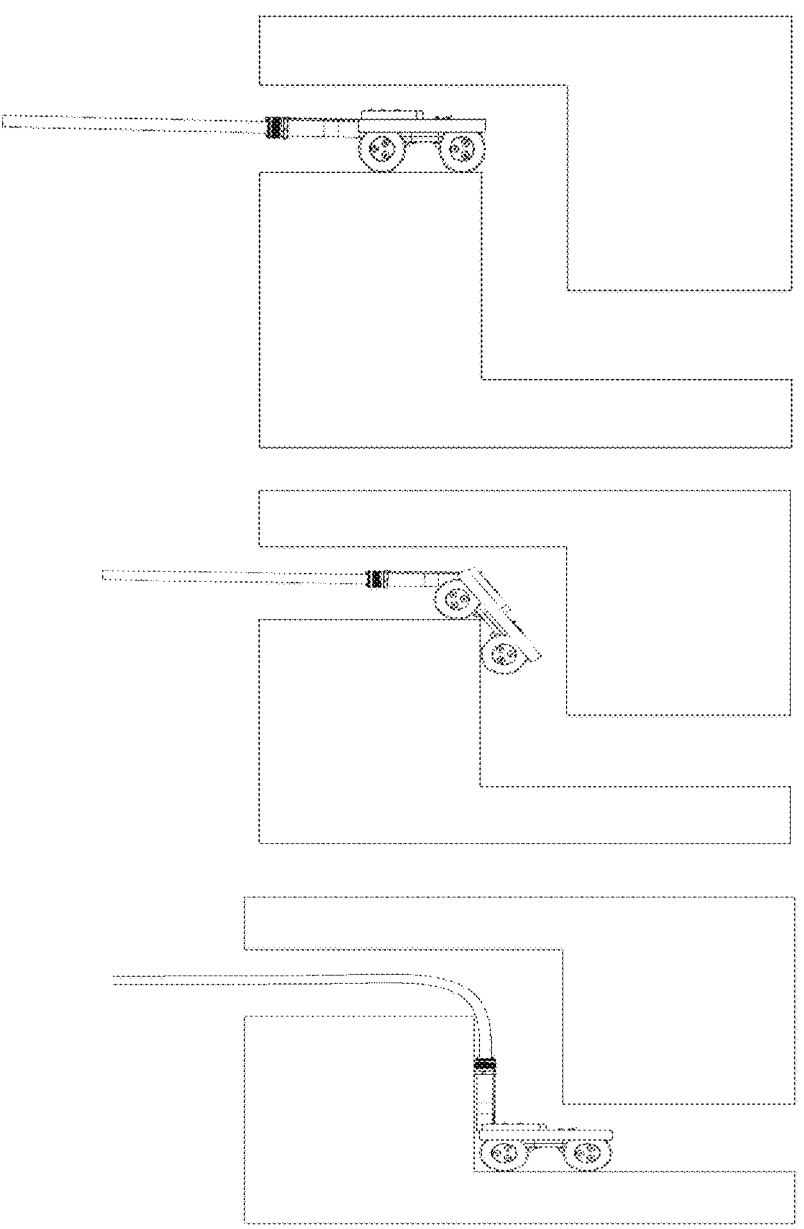
Figure 5: Multiple positions of a climbing robot with tether linkage navigating through a constrained area

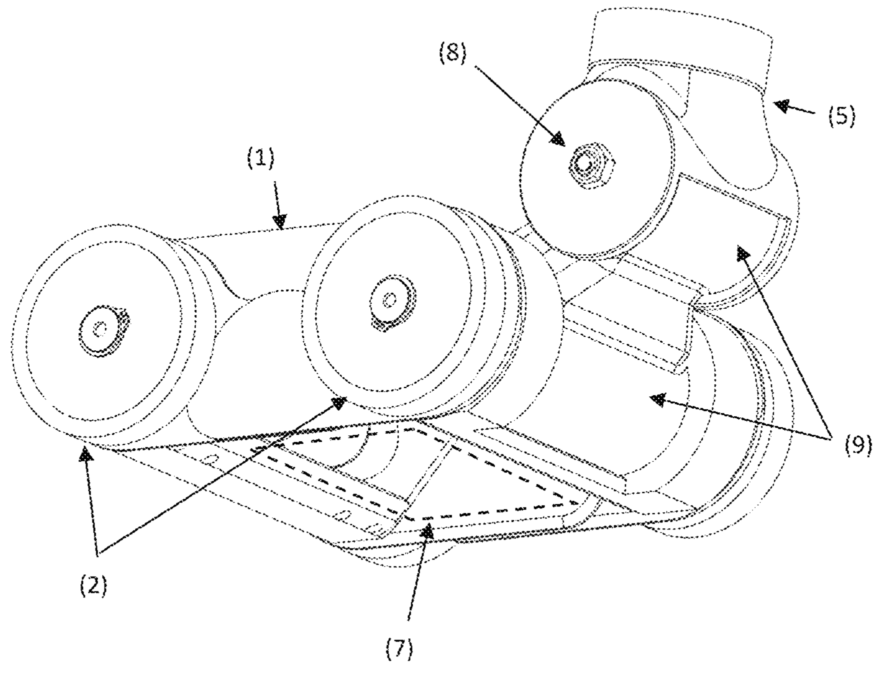
Figure 6: Isometric view of suction-type climbing robot with tether linkage

TETHERED MOBILE CLIMBING ROBOT FOR INSPECTING TANKS IN CONFINED ENVIRONMENTS

DESCRIPTION OF ATTACHED APPENDIX

Not Applicable

BACKGROUND OF THE INVENTION

Mobile climbing robots (MCRs) are commonly used for performing remote inspection or repair tasks in a wide range of conditions. A few examples include robots performing inspection inside piping (U.S. Pat. No. 9,739,792B2), inspection of storage tanks (UC5451135A), operations on the external hulls of ships (US Application US20090166102A1) or repair or manufacturing operations inside ships (US Application US20120111843A1). In current approaches, the mobile robot system acts as an extension of human operator to perform tasks remotely. This requires the robot to be able to enter and traverse surfaces of interest away from the operator using onboard actuators and drive systems. In many cases, these surfaces are inclined, vertical or overhead and require the robot to adhere to these surfaces while performing the task. Inspection is a very common task performed using remote robots and the objective of the robot is to position a tool in a preferred location and orientation along or around the structure being inspected. Cameras are a common tool used in inspection.

This remote inspection has several benefits. It can protect the operator from exposure to dangerous conditions or hazards. It can allow access to areas that could not be accessed manually due to space, heat or other environmental hazards. It can allow structures to be inspected or repaired without alteration or disassembly of components, and in some cases even allow the system to remain in operation during the inspection and or repair process. These benefits can yield significant financial incentives and therefore technology that enables and advanced mobile inspection and repair is important.

One of the limitations to remote inspection and repair is the mobility challenge associated with maneuvering the robot into and around the inspection region. In many cases, the challenges are associated with limited space or unclear passageways into and around the inspection region and the requirement to move through or around these areas. The DCSS (Dry Canister Storage System) is an example of such a challenge. The DCSS is used to store nuclear fuel rods. Several different arrangements of the DCSS exist. In one common configuration, the DCSS consists of a concentric cylindrical system with an inner canister made of stainless steel cylinder, contained inside of a concrete cask or overpack. The inner canister has a relatively small clearance region between the canister and cask. The overpack or cask is approximately 24 inches thick and has a concrete lid attached to the top. The cask has a series of air vents located near the top end of the cylinder. These vents are approximately 4 inches tall and pass from the exterior to the interior of the cask with one or more vertical steps. These vents connect to the annular region between the outer cask and inner canister. These vents provide an access point for a mobile robot to get to the inner cask for inspection and potential repair or remediation.

It is desirable to periodically inspect the interior canisters to ensure their integrity. It may be desirable to perform some remediation procedures on the exterior surface of the canister as well. It is undesirable to remove the lid of the concrete cask or to remove the canister from the cask, since this could dislodge the nuclear fuel. Remote access through a climbing robot is desired to perform periodic inspection of the canister without any physical changes or alterations to the storage system required.

This invention addresses the challenge of increasing mobility of mobile climbing robots when maneuvering through restricted spaces or over or around features such as obstacles, corners or edges. For this work, corners or edges refer to intersections of the climbing surfaces with these intersections occurring commonly at right angles, but could occur at other angles. For example a transition from a flat to a vertical up surface, flat to a vertical down surface, vertical to overhead surface or reversed order in any of these cases represent corners and edges. Corners will refer to the case in which the angle between the two surfaces is less than 180 degrees, while edges will refer to the case in which the angle between the two surfaces is greater than 180 degrees. This work further applies to mobile climbing robots that require a tether to transmit one or a combination of power, signals or fluids/materials required for the associated inspection or remediation process. Finally, this work assumes that space limitations exist that require the mobile climbing robot to be relatively small. This reduced size makes the tether represent a significant component of the MCR system in terms of size, mass and can impact the MCR system mobility.

RELATED WORK

From a technical modeling standpoint, tethers are considered (and correspondingly modeled) as flexible members that are generally rigid, or have higher stiffness, in tension only while have no stiffness relative to bending. Therefore, there is little specific treatment of managing tether rotation relative to the robot in the literature since the tether itself is assumed to behave as a series of revolute joints (see for example the patent "Communications spooler for a mobile robot, U.S. Pat. No. 73,311,436B1, Pack, Sawyer, Won and More). However, in practice, tethers for MCRs may have sufficient density to represent a degree of stiffness and this is particularly important if the size of the MCR is reduced or the MCR is required to navigate large changes in climbing surface geometry.

The U.S. Pat. No. 5,435,405 (Schempf, Albrect) calls out a tether attachment member, and indicates a commercial ball joint tow point adapter and termination and tether strain relieve apparatuses that are commercially available. However, these apparatuses do not take into account the robot motion and require protrusion of the apparatus from the chassis beyond the wheel members to aid in keeping the tether away from the contacting wheels. Further, these do not integrate the tether inside the apparatus. Atwood et. Al (U.S. Pat. No. 9,739,792B2) describe a tether connected to a pipe inspecting robot that serves as both control and retrieval purposes but relies on the tether for bending. Similarly, Coughlan et al. (U.S. Pat. No. 5,022,812A) show a tether directly attached to a mobile robot, in this case an IED robot that has sufficient mass and power such that forces created by the tether are negligible to the robot.

SUMMARY OF THE INVENTION

The proposed invention consists of a mobile climbing robot (MCR) with wheel or endless-track type propulsion and uses magnetic attraction to generate stabilizing forces while operating in climbing conditions. The magnetic attraction can be generated through either permanent magnets or electromagnets. The magnets can be located within the chassis of the MCR, attached to the tracks of the MCR, or located in wheels of the MCR. The remaining discussion will assume the MCR consists of a four wheels, two located on each side of the MCR chassis, with permanent magnets residing in the wheel, such that the wheels generate adhering forces, driving forces and steering through skid-steer, differential control of the left and right wheel velocities. The MCR wheels protrude around the chassis in the forward and reward ends of the chassis, and can therefore make contact with two climbing surfaces at edges or corners. This enables the MCR to transition over corners. Further, the MCR wheels are relatively close and placed on the chassis in a way that enables the MCR to transition over edges. The tether connects to the MCR through a tether linkage attached to the chassis with a revolute joint. The tether is strain-relieved to the tether linkage and resides inside the tether linkage and on to the chassis. This allows the tether to pivot out of the way when the MCR passes over a corner or an edge. Further, it reduces any rubbing between the tether and the climbing surface when passing over a corner or an edge with prevents damage to the tether. An emergency retrieval cord—a high strength cord that can allow the MCR to be pulled out of the inspection region—can be included as part of the tether. When the tether linkage is connected to the chassis in-line with the MCR, any pulling forces placed on the emergency retrieval cord are passed directly to the chassis in a manner that can reduce or eliminate moments applied to the chassis during an emergency retrieval.

BRIEF DESCRIPTION OF DRAWINGS

FIG. 1 shows an isometric view of the basic form of the climbing vehicle with tether linkage FIG. 2 shows a side view of the basic form of the climbing vehicle with tether linkage FIG. 3 shows the basic form of the climbing vehicle with tether linkage navigating a convex surface FIG. 4 shows the basic form of the climbing vehicle with tether linkage navigating a concave surface FIG. 5 shows the climbing vehicle with tether linkage in multiple positions traveling through a constrained area FIG. 6 shows a view of the climbing vehicle with tether linkage where the climbing vehicle uses suction to generate adhering forces to the climbing surface, and the tether linkage can transfer both electrical signals and air pressure

DETAILED DESCRIPTION OF THE INVENTION

The invention disclosed here describes a mobile climbing robot (MCR) that is able to traverse climbing surfaces while accommodating variations in the geometry of the climbing surface such as edges or corners. In a basic form, the invention consists of a chassis (1), propulsion members shown as wheels (2) in the figures but could also be tracks, magnets (3) for generating adhering forces with the climbing surface (or suction chamber, (7), FIG. 6), drive motors with gearing transmission (4), tether linkage (5), and tether (6) as shown in FIGS. 1 and 2. The climbing vehicle is operating on a climbing surface that may contain variations in geometry such as edges or corners. The chassis forms the body of the MCR and can be used to mount inspection or remediation tools or other components. The tether linkage is pivotally connected to the chassis through a revolute joint (8), FIG. 6. The location of the revolute joint can be selected for preferred motion of the tether linkage. In a general sense, locating the tether linkage revolute joint with one of the axes of the propulsion members offers good performance. The tether linkage allows high mobility of a tethered mobile robot when navigating through regions of changing geometry. A tethered mobile robot is one which has a tether, cable or other connection running from some fixed location to the mobile robot and remains attached during operation. In general, the tether can create difficulties with operation of the mobile robot when operating over varying geometries. One such example is passing through vent regions as shown in FIG. 5. The purpose of the tether linkage is to maximize the size of the vehicle by adapting the mobile robot and tether attachment geometry to the climbing surface.

FIG. 3 shows the basic form of the MCR climbing over convex climbing surface with the tether linkage adapting to the changing geometry. These figures demonstrate some of the benefits of the tether linkages. The tether linkage serves multiple purposes. It keeps the causes the tether to move in a kinematically prescribed motion relative to the mobile robot chassis in the region near the mobile robot. It protects the tether at attachment due to flexure or climbing surface edges. It can allow for very large range of motion of the tether at the point of attachment, even for large tethers. One way in which this can be achieved is by incorporating slip rings or loops of tether within the tether linkage. The tether linkage can also serve as a junction box in connecting electronic components of the robot to the tether. The tether linkage can serve as a location for providing strain-relief in the attachment of the tether to critical components within the robot. The tether linkage can serve as a location to attach a strong cord to be used for retrieving the robot.

In situations where the mobile robot is a climbing mobile robot and relatively small, it is important to reduce external forces on the robot to maximize that effect of adhering forces between the robot and the climbing surface (these adhering forces could come from magnetics or suction for example). A tether or cable commonly has inherent bending stiffness. When the climbing robot is navigating over a changing surface, the bending moment of a traditional, fixed tether or cable could generate a moment on the climbing robot which could reduce its ability to climb. The tether linkage is created from a kinematic pair, revolute joint which can create no moment about the axis of rotation and reduce any moments at the connection between the tether and the robot within the tether linkage.

Finally, the tether linkage forms an additional rigid body directed along the axis of the tether. This can serve as a location to place a camera and view along the tether. This can be useful in navigating in and through passageways with changing geometry.

FIG. 4 shows the basic form of the MCR climbing over a concave climbing surface with the tether linkage adapting to the changing geometry.

FIG. 6 shows how the tether linkage (5) could also be adapted to create a port that can rotate by 90 degrees or more about one axis with sliding baffles (9) for transferring air under pressure or vacuum to the MCR chassis.

The tether connecting to the tether linkage can formed of multiple members, such as power cable, control signal cable and feedback signal cables, as well as emergency recovery cord and over covering.

The invention can apply to mobile robots in climbing or ground-based applications.

What is claimed is:

1. A suction-based climbing robot for traversing a climbing surface and traversing variations in geometry of the climbing surface comprising, a chassis, at least one propulsion wheel attached to the chassis, a suction chamber, a tether linkage wherein the tether linkage creates a port that can rotate by 90 degrees or more about one axis with sliding baffles that restrict air flow to maintain pressure or vacuum in air transferred to the suction-based climbing robot, and a tether that includes a tube that transmits air flow under pressure or vacuum.

2. The climbing robot of claim 1 wherein the tether linkage includes an elastic tether holder.

3. The climbing robot of claim 1 wherein the tether linkage contains an emergency recovery cord that is directly attached to the chassis.

4. The climbing robot of claim 1 wherein the tether linkage contains a camera that can view along the tether.

* * * * *